United States Patent [19]

Di Rosa

[11] Patent Number: 4,659,895
[45] Date of Patent: Apr. 21, 1987

[54] AUTOMATIC SYSTEM FOR ASSEMBLY AND WELDING OF MOTOR VEHICLE BODIES

[75] Inventor: Gaetano Di Rosa, Pino Torinese, Italy

[73] Assignee: Fata European Group S.p.A., Italy

[21] Appl. No.: 528,515

[22] Filed: Sep. 1, 1983

[30] Foreign Application Priority Data

Sep. 2, 1982 [IT] Italy ............................... 23102 A/82

[51] Int. Cl.⁴ ......................... B23K 9/12; B23K 37/04
[52] U.S. Cl. ....................................... 219/79; 219/80; 219/86.24; 228/4.1
[58] Field of Search ....................... 219/79, 80, 86.24; 228/4.1, 6.1, 47, 49.1

[56] References Cited

U.S. PATENT DOCUMENTS

| | | | |
|---|---|---|---|
| 4,162,387 | 7/1979 | De Candia | 219/79 |
| 4,442,335 | 4/1984 | Rossi | 219/79 |
| 4,483,476 | 11/1984 | Fujikawa et al. | 228/4.1 |

Primary Examiner—E. A. Goldberg
Assistant Examiner—Catherine M. Sigda
Attorney, Agent, or Firm—Toren, McGeady and Goldberg

[57] ABSTRACT

An automatic assembly and welding system is provided for carrying out the building of various shaped sheet metal members, particularly motor vehicle bodies. The system comprises a single welding station, horizontal conveyor means for conveying vehicle frames to the welding station, and a pair of endless vertical conveyor mechanisms located on opposite sides of the welding station. The vertical conveyor mechanisms are capable of selectively bringing to a vertically oriented position adjacent the welding station and removing from the welding station various different automotive frames or body members to enable a continuous circulation of the body members along a path established by the vertical conveyor mechanism operating to repeatedly deliver new body members to the welding station.

4 Claims, 14 Drawing Figures

AUTOMATIC SYSTEM FOR ASSEMBLY AND WELDING OF MOTOR VEHICLE BODIES

In this invention an automatic system is provided for carrying out the building of various shaped sheet metal members, and similar items, of one-piece construction, such as for example, preferably motor vehicle bodies, or else other products made from thin sheet metal.

The system consists substantially of:

(a) a so-called "rise and travel" line which may be of the type disclosed in a preceding patent application (67632 A/81 dated 11.5.81) by the same inventor, and which permits vertical and horizontal travel to enable the alternation of various motor vehicles with respect to each other;

(b) a welding, usually known as tack welding, station, consolidating said line and physically arranged to span said line;

(c) two absolutely novel apparatuses, comprising various devices, and installed on both sides of said tack welding station, designed to support, to position or to store in vertical position various forms; preferably three per side, so as to permit the manufacture in each individual case of the various types of motor vehicle bodies when and as required;

(d) driving and control equipment, complete with actuators, relay logic or programmable logic, already known in the art.

It is suggested that the forms incorporated in each apparatus point (c) be provided with accessories already known in the art, depending on the product to be assembled and capable of positioning and clamping the parts comprising the motor vehicle body.

The present invention relates to an automatic system for assembly and welding of motor vehicle bodies.

The system can also be used for the manufacture of parts of motor vehicle bodies, as well as of various parts of vehicles all made from thin sheet metal and which can range from lorry cabs, to metallic furniture and the like. Hence it forms a system of great technological importance.

Systems designed to achieve such a scope, even if confined mainly to just motor vehicle bodies, are already old in the art.

Briefly, it can be said that the technology in question has passed over the years through the following solutions which are still in current use:

(1) Operation with one single and fixed station
(2) Operation with the so-called "Gate-Line" system
(3) Automatic operation with multiple welders
(4) Operation with the so-called "Robot-Gate" system.

The first solution entails a single station comprising the forms and welding machines to which are approached the components by means of conveying systems, generally of the overhead type.

This solution is limited as it permits the manufacture of just one basic specific type and few variations to this type.

Flexibility (that is the possibility of fabricating more than one basic type within the same period of time) to this first solution can only be achieved by providing more than one fixed station comprising bank-mounted welding machines and forms with consequent employment of considerable means.

The second solution entails instead of just the one station, a continuously moving carrousel assembly line (sometimes known as the "Gate-Line") consisting of various trolleys spaced along the carrousel line, each one comprising fixtures for supporting the automotive frame or the flat part of the body on which are paired automatically the side forms for the side panels, approached therein by a "parallel" overhead conveyor system synchronized with the carrousel line.

This second solution is flexible in that it permits working different types of motor vehicle bodies, seeing as though the side forms can be of various types and can be stored at the beginning of the line without interfering with the manufacturing process. However even this solution has limitations in that the welding system provided is usually manual because it is difficult to automate with the aid of robots and because the number of indispensible forms is very high.

The third solution incorporates welding clamps on the forms and therefore it does not use robots.

With this system the welding process is already made fully automatic, but flexibility is totally lacking in the production as regards each manufacturing unit. As in the first solution, in order to achieve such flexibility, various bank-mounted units must be adopted, with all the aforesaid disadvantages.

Lastly the fourth solution (called "Robot Gate"), which is the subject of U.S. Pat. No. 4,162,387 incorporates a single fixed station in which operate side forms movable in the longitudinal direction, in order to be able to fabricate the different types of motor vehicle bodies.

The welding systems are incorporated in the station in this solution. For reasons stated above, this solution differs from the preceding ones in that besides flexibility, it also permit tack welding in fixed position and automatic welding with robots.

It has become apparent that the fourth solution involves difficulties which can be significant from a practical point-of-view because the solution on the one hand assumes the availability of an area for the storage of the forms or body parts which is not always present in the factory; on the other hand it is necessary to provide stations with just a standby function, and therefore not necessary for the manufacturing process.

The system in accordance with the present invention enables the use of system components which are already old in the art, namely:

(a) a "rise and travel" device, of the type disclosed in preceding patent application 67632 A/81 by the same inventor;

(b) welding means such as robots and (c) fixtures co-operating with the welding process, such as, for example, centering and clamping devices, as well as:

(d) electrical control equipment.

Since these elements may be readily selected within the knowledge of one having ordinary skill in the art, and since they do not constitute parts of the novel elements of the invention, a detailed description thereof is omitted since it is not necessary to a complete understanding of the invention.

The system in accordance with the invention is novel however:

(1) firstly because it also comprises a multi-column support structure for the welding station, as well as, on each of the two sides of the line, an apparatus, comprising in turn various devices, designed to convey in the vertical direction, more than one form (preferably three) having provision for alternation through a "paternoster" type movement as well as for their storage;

(2) secondly it is novel because each of said two apparatuses comprise above all means such as chains for supporting and vertical conveying of said forms, as well as their horizontal conveying and subsequent storage, means such as wheels and guideways for correct aforementioned movement, plugs for centering the various forms in working position and lastly shafts and drive units, as well as suitably located slots designed to permit correct centering and clamping operations;

(3) thirdly it is novel because the entire system as-designed can be accommodated in one single station (or pitch), therefore it has minimum overall dimensions and does not require either lower or upper support structures, located outside the station in accordance with the invention;

(4) fourthly it is novel because the layout of the forms in said side apparatus, is in the vertical or almost vertical direction, that is in the direction of their shortest dimension, hence when the system is operating, the alternation of the various forms can take place in the shortest possible time;

(5) fifthly it is novel because when there are three or more forms in said side apparatuses, their reciprocal layout is such that their alternation (which is possible in either of the two directions of rotation) always takes place in the shortest time, as the stored forms are placed side-by-side;

(6) sixthly it is novel because the time taken during operation of the system for the alternation of the forms with respect to each other takes place in the dead time corresponding to the time taken, in the one single station, for the transfer of a new motor vehicle body after the retraction of the preceding body, therefore there are no superfluous times in the work cycle;

(7) in the seventh place it is novel because its extent in the vertical direction is no greater but it is similar to that of systems already old in the art, because said system incorporates, in its upper section, not only the robots and electrical control panels, as has been the case up till now, but also the store for the forms.

(8) in the eighth place it is novel because the system utilizes the so-called "rise and travel" device (protected by another patent application by the same inventor) which allows maximum simplication of the movements of the centering and clamping devices for the lower part of the motor vehicle in the station, without having to resort to auxiliary means such as trolleys or pallets.

These design features and others of lesser importance will appear clear from the following completion of the description with reference to the accompanying drawings, given as an exemplification of the principles of the invention, without limitation, illustrating a preferred embodiment of the system in accordance with the invention.

Figure 5:
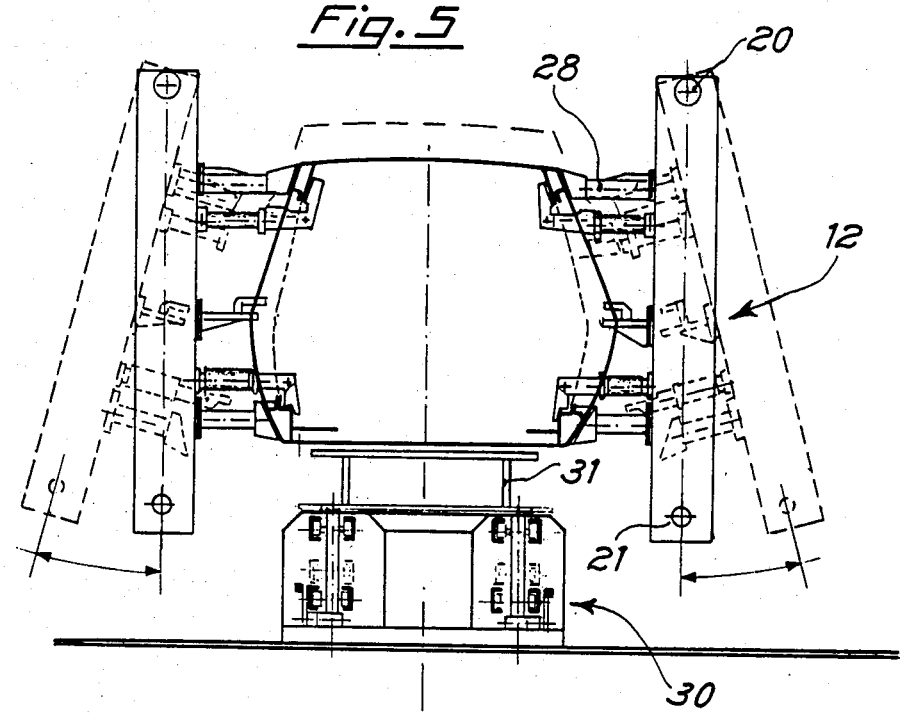
Figure 5A:
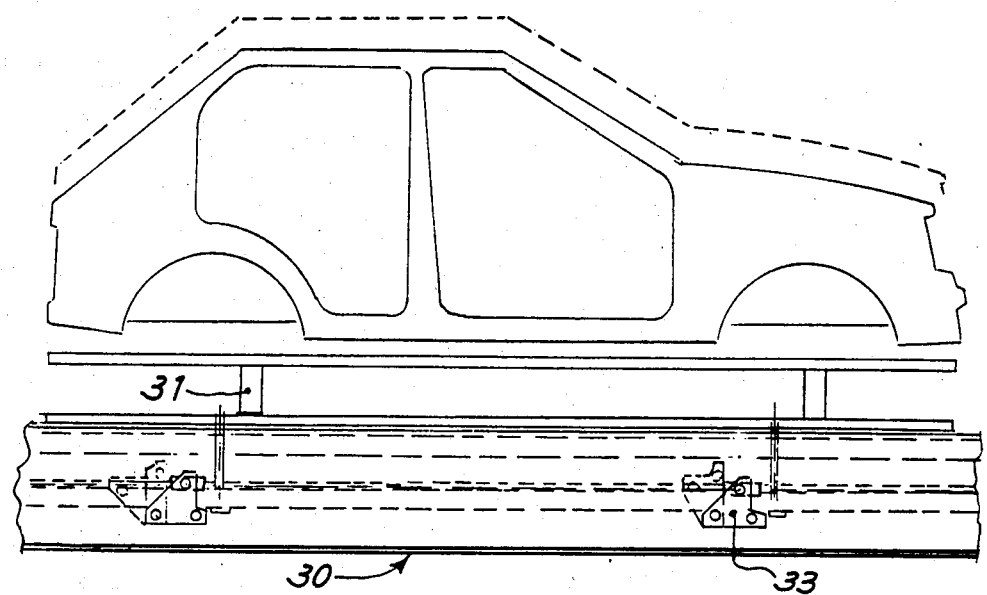
Figure 6:
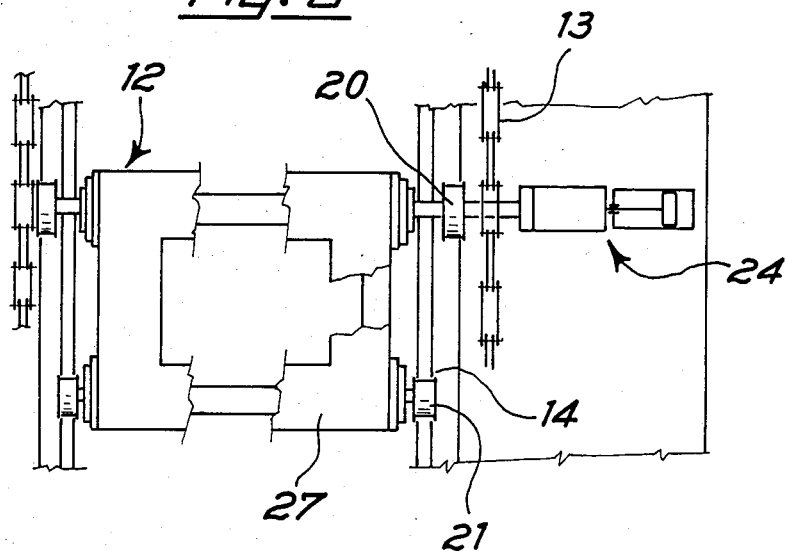
Figure 6A:
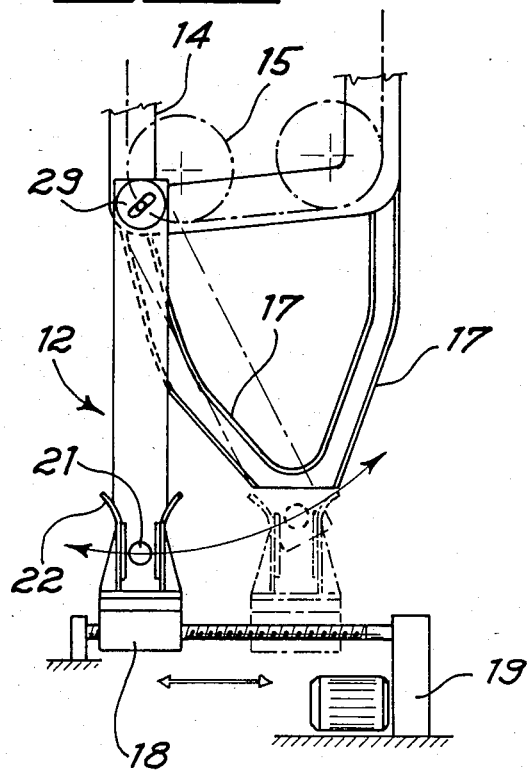
Figure 6B:
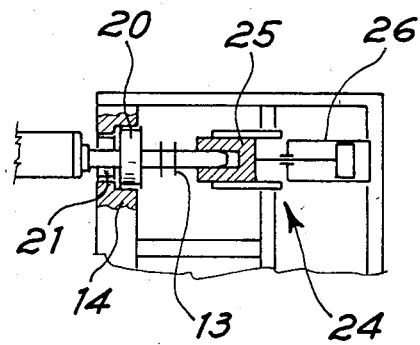
Figure 7:
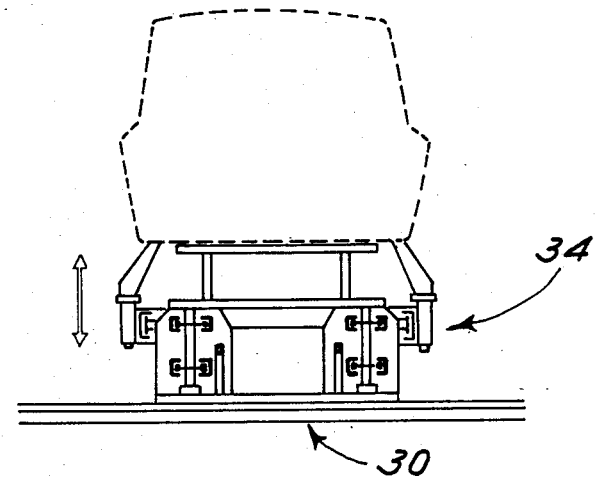
Figure 7A:
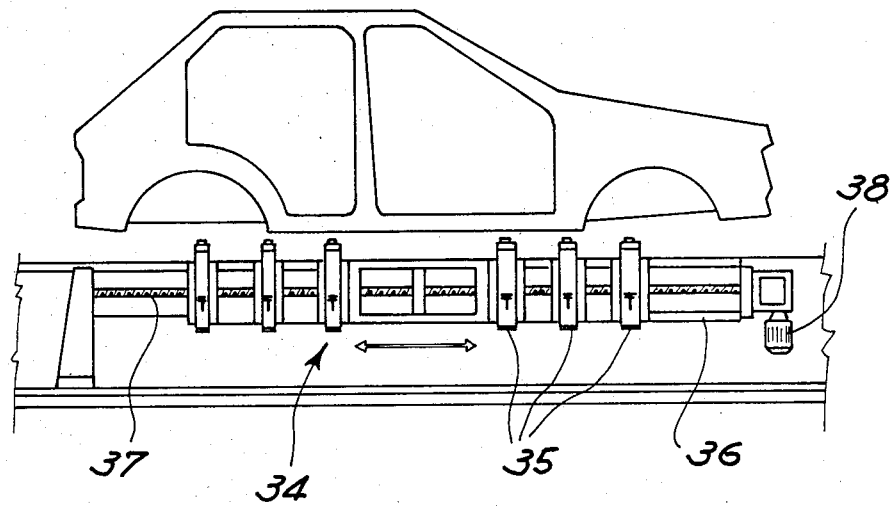

FIGS. 4, 4a, 4b and 4c show schematically the various phases of substitution and alternation of the forms, rendered possible by the system in accordance with the invention, starting from the working position, and gradually from this position to the position of release of the forms from the body, to the (optional) partial substitution of one form with the other and finally to the completion of the operation;

FIGS. 5 and 5a are detail views of the working station in cross section and side elevation showing the application of the rise and travel device to the system in accordance with the invention;

FIGS. 6, 6a and 6b are details illustrating the driving and centering means of the forms;

FIGS. 7 and 7a are details of the clamping devices for the lower part of the body, showing the possibility of its application to various types of motor vehicles.

As can be seen from the drawings, the system in accordance with the invention essentially comprises—as novel part—on each side of the line an endless conveyor assembly 10 comprising in turn various devices.

These conveyor assemblies 10 are designed to convey in the vertical direction various forms or assembly units 12 (preferably 3 in number indicated by the letters A, B and C in the figure) which have provision for alternation through a "paternoster" type movement as well as for their storage. A "pater noster" conveyor is a vertical conveyor where transported items move at the same time both upwardly and downwardly.

Each of the conveyors 10 is fitted to a structure 11 with multiple support columns for the station, resting on the floor. From the various figures, it can be seen that in each conveyor 10 there is as follows: a chain conveying and connecting system 13 for the units 12, wheels 20 and 21 for guiding and supporting frame 27, a slide way 14 for frame 27 of said units. Also to be observed in each conveyor 10 (see FIG. 1 to the right when viewed from front), there are toothed gear wheels 15 for storage of chains 13 as well as other fixed lower guideways 17 for the correct movement of said frame 27, plus plugs or blocks 18, 23, 24 for the centering in working position of the various forms 12 and lastly shafts and drive units 16,19,22.

Figure 4:
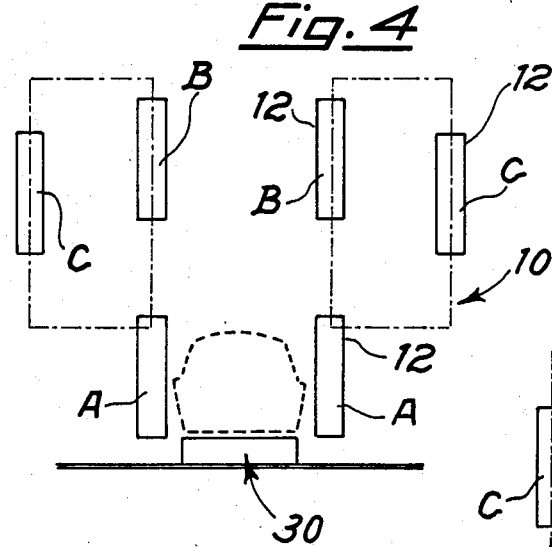
Figure 4A:
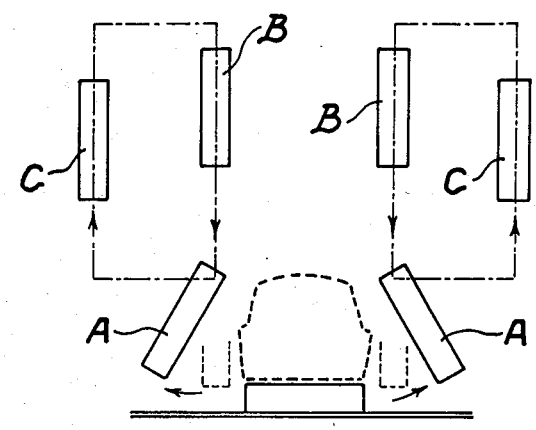
Figure 4B:
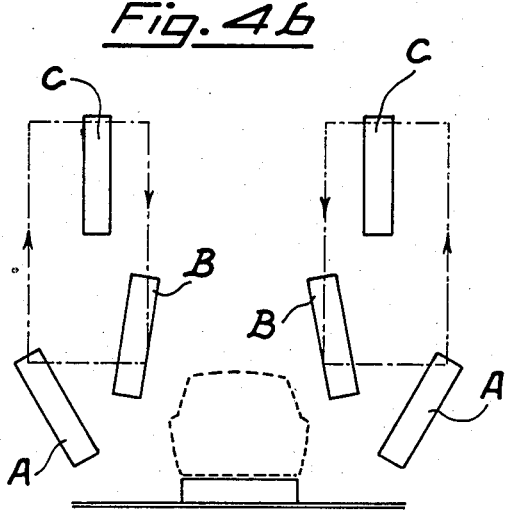
Figure 4C:
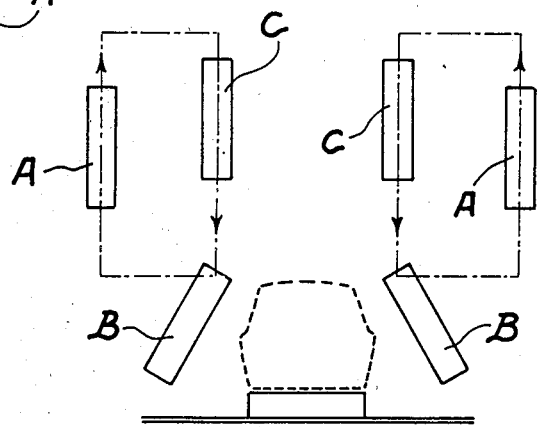

More exactly, the number 22 really denotes an input guide for the device 10 determining oscillation of the frame 27 (more clearly visible in FIG. 4a).

Finally drawings (FIGS. 6, 6a, 6b) complete the system with latch or plug 25 operated by actuator 26 for clamping the upper part of frame 27 at the level of the roll 20; 28 denotes a clamping unit of the body side, and 29 denotes a slot which permits freedom of movement of frame 27 with respect to slide way 14 and to chain 13. All the above listed parts are those essentially making up the conveyor 10 which are substantially, as seen earlier on, the heart of the invention.

Besides the above, and mainly in FIGS. 1, 3, 5, 5a and 7 there is illustrated the "rise and travel" device, which as stated previously has already been protected by the inventor, but nonetheless it is also included in the system in accordance with the invention. This "rise and travel" device comprises line 30, with support means 31, guideways and an oscillating unit 33 determining the vertical movement of said means 31.

The term "rise and travel" refers to a device where the body of a motor vehicle is made to advance by means of a transport line to bring the body at a suitable working level where it is grasped by suitable locking and position matching means.

Figure 1:
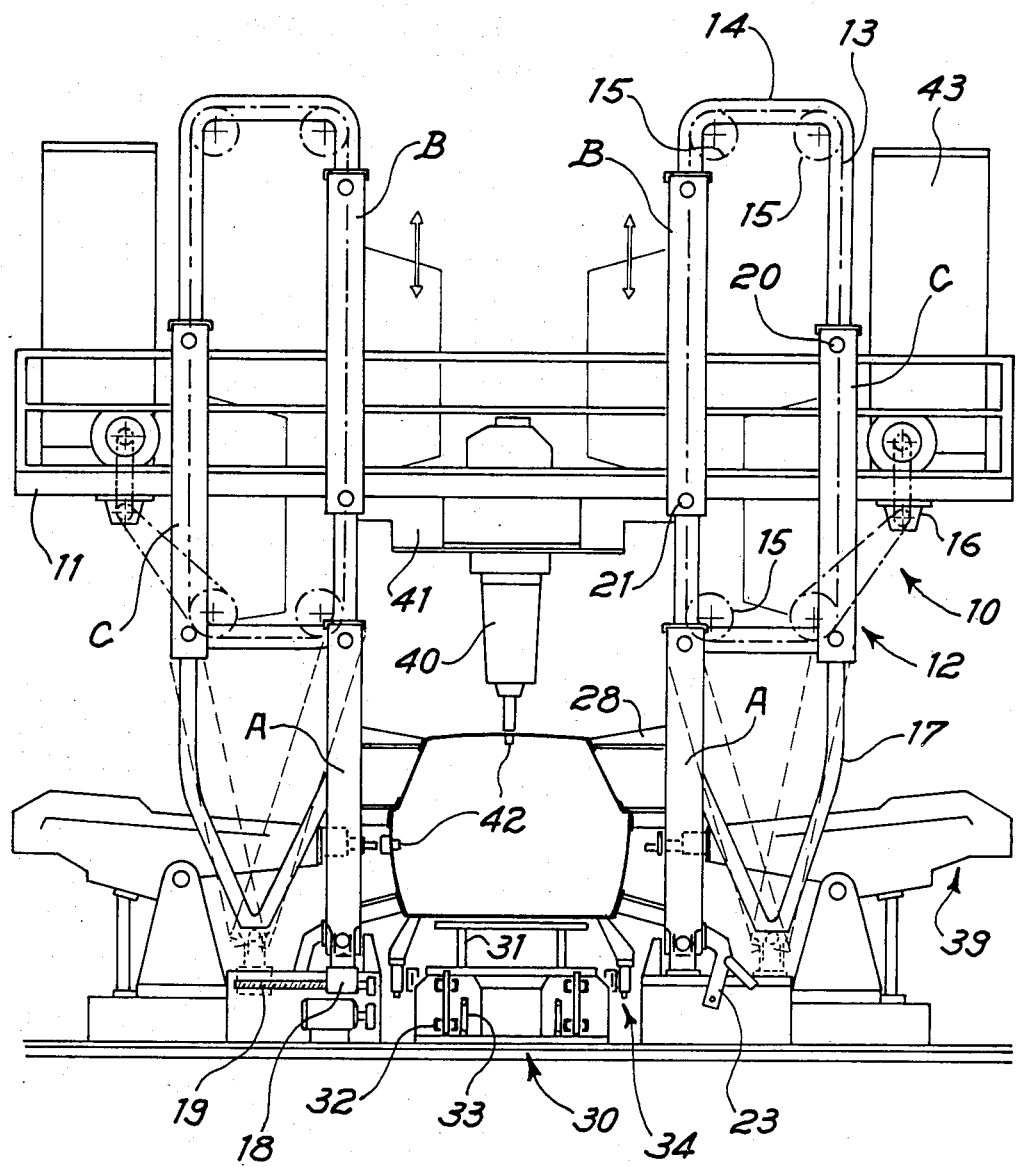
FIG. 1 is a cross sectional view of the system in accordance with the invention for assembly and welding of the motor vehicle body, located at single working station provided.
Figure 2:
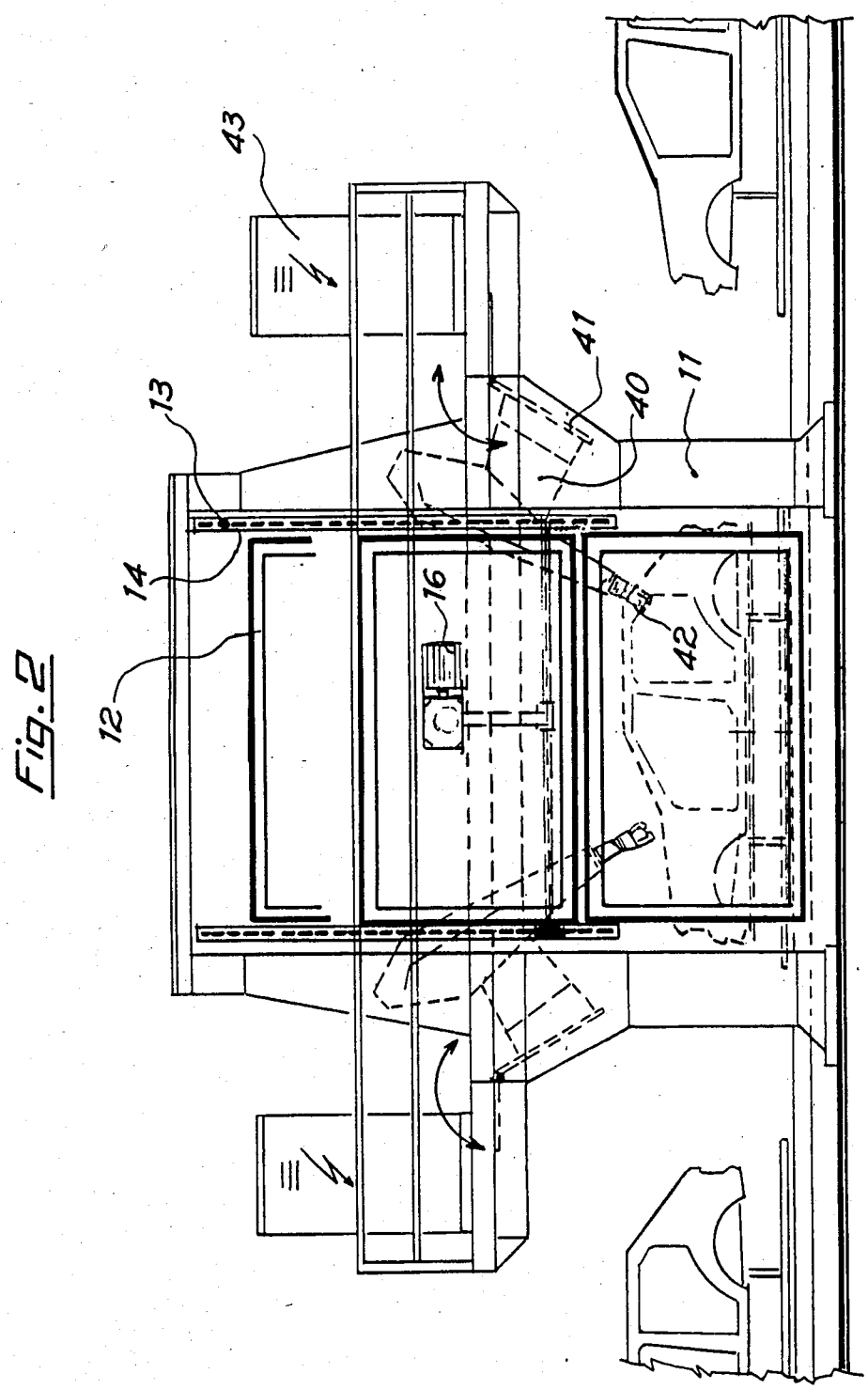
FIG. 2 is a side view of said system.
Figure 3:
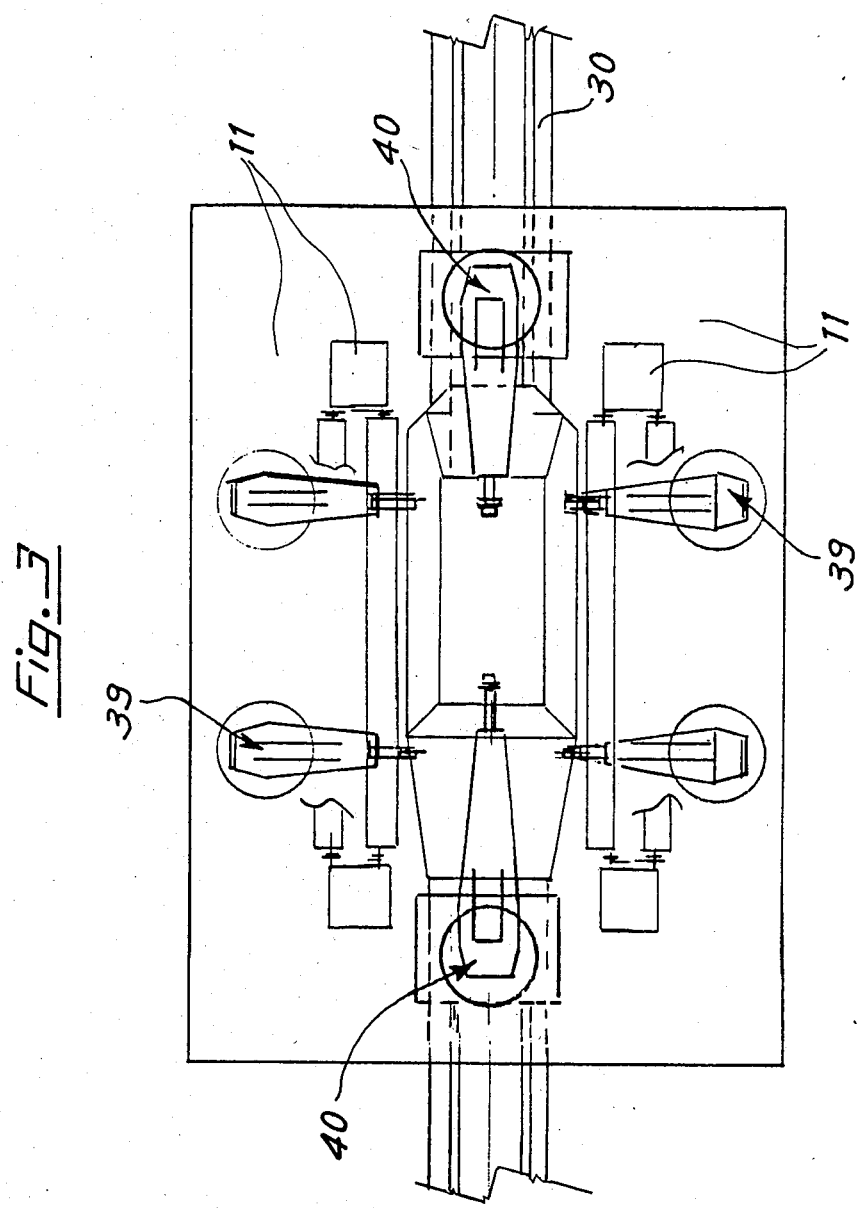
FIG. 3 is an equivalent plan view with diagrammatic view of the positioning of the various welding devices or robots.

Co-operating with the said "rise and travel" device is a device 34 for clamping the lower part of the motor vehicle body (visible in FIGS. 1, 7 and 7a).

Said device 34 comprises in turn clamping means 35, slideways 36 for said means 35, a screw-type actuator 37 for said sliding movement and drive unit 38 for said actuator.

Finally in the drawings, number 39 denotes the side welding robots, 40 denotes the front welding robots, 41 denotes an oscillating bracket which permits rotation of said robots 40 on said bracket, 42 denotes the welding clamps and 43 denotes the general electric or electronic control of the system.

The basic purpose of the invention is to convey to a welding location various parts of an automotive body or frame so that the various parts can be welded at a welding station. Since different shapes of the automotive body may be required, the equipment is capable of selectively bringing to the welding station different body parts, depending upon the type of automotive frame or body which is to be assembled.

Located on opposite sides of the welding station are the endless conveyor assemblies 10, each of which is provided with three support or assembly units 12. The assembly units 12 are distinguished one from the other by the letters A, B, C. Thus, each of the elements identified by A, B, C are an assembly or conveying unit 12.

Each of the assembly units 12A, 12B and 12C contain or include locking systems or units 28, which operate to firmly hold individual parts of the automotive frame. When it is intended to assemble one type of frame, units 12A are brought into position at the welding station and the automotive frame parts which are supported thereby are welded in place.

Alternatively, the assembly units 12B may be both placed in position at the welding station, whereupon, a different automotive frame may be assembled.

Similarly, the units 12C may also be moved so as to bring to the welding station the automotive frame parts supported thereby.

As a result, different vehicle models may be supplied by selectively alternating the positioning of the units 12A, 12B and 12C at the welding station.

It is to be understood that the foregoing disclosure, as already emphasized in the background of this specification, is only one preferred embodiment of the invention of which numerous variations may be effected by persons skilled in the art without departing from the true scope and spirit of the invention which in fact includes them all and which is defined clearly by the appended claims.

I claim:

1. An automatic assembly and welding system, particularly for motor vehicle bodies, wherein a plurality of different components may be delivered to and assembled at a single welding station, comprising:

means defining a welding station including welding apparatus for assembling parts of motor vehicle bodies;

a rise and travel device comprising horizontal conveyor means for conveying vehicle frames to said welding station along a generally horizontal path; and a pair of vertical conveyor mechanisms located on opposite sides of said welding station, each adapted to selectively convey to said welding station a plurality of different body parts for assembly at said welding station;

each of said vertical conveyor mechanisms comprising endless chain means and body part clamping means operating to deliver said body parts to said welding station by conveyance thereof along juxtaposed vertical paths;

said body part clamping means each including a plurality of clamping devices driven by said endless chain means for clamping and conveying a plurality of different body parts;

each of said clamping devices including a generally elongate frame member having an upper and a lower wheel and said vertical conveyor mechanisms further including guidance means engaging said upper and lower wheels for establishing orientation of said frame members relative to said welding station during conveyance of said body parts;

said guidance means including
means for bringing said frame members along a downwardly directed path to a generally vertically oriented position adjacent said welding station, and
means for shifting said upper and lower wheels away from said welding station after assembly thereat of a body part thereby to laterally move said frame members away from said welding station;

said endless chain means thereafter operating to drive said frame members vertically upwardly away from said welding station to enable mounting thereon of a new body part with circulation of said frame members along a path established by said endless chain means operating to repeatedly deliver body parts to said welding station.

2. A system according to claim 1, wherein said guidance means further include guideways within which said wheels engage for defining the direction of travel of said frame members.

3. A system according to claim 2, wherein said guidance means further include driving means including threaded shaft means for shifting said lower wheels of said frame members laterally relative to said welding station.

4. A system according to claim 1, wherein each of said body part clamping means comprise at least three individual clamping devices each capable of conveying an individual body part arranged in such a manner that alternation is possible in either of two directions of rotation of said endless chain means.

* * * * *